3,216,993
1,9 NITROARGININE BRADYKININ AND INTERMEDIATES FOR THE PREPARATION THEREOF
Miklos Bodanszky, Princeton, and Miguel A. Ondetti, Highland Park, N.J., assignors to Olin Mathieson Chemical Corporation, New York, N.Y., a corporation of Virginia
No Drawing. Filed Apr. 18, 1962, Ser. No. 188,565
3 Claims. (Cl. 260—112.5)

This invention relates to new peptides, and more particularly to the new nonapeptide, nitro-L-arginyl-L-prolyl-L - prolyl - glycyl - L - phenylalanyl - L - seryl - L-prolyl-L-phenylalanyl-nitro-L-arginine (hereinafter called 1,9-nitroarginine bradykinin); and new intermediates useful in the preparation thereof.

The final product of this invention is a biologically active material, which possesses the same qualitative activities as does bradykinin. The fact that the compound does have such activity is surprising, since it is well known that the biological activity of bradykinin is strictly dependent on the total structure of the compound and that even minor deviations from this structure lead to a complete loss or a substantial decrease in activity [Guttman et al., Helv. Chim. Acta, 44, 1713 (1961)].

The final product of this invention is prepared, according to the processes of this invention, from simpler peptides, as more fully detailed in the following examples.

The following examples illustrate the invention (all temperatures being in centigrade):

EXAMPLE 1

*Benzyl benzyloxycarbonyl-nitro-L-arginyl-L-prolinate*

A solution of benzyloxycarbonyl nitro-L-arginine (3.53 g.) and triethylamine (1.4 ml.) in a mixture of dioxane (100 ml.) and dimethylformamide (5 ml.), is stirred and cooled to 11–12° and isobutyl chloroformate (1.4 ml.) is added. The stirring and cooling is continued for 30 minutes and then the suspension is added to a mixture of proline benzyl ester hydrochloride (2.41 g.), dioxane (30 ml.) and triethylamine (1.4 ml.). After mixing, the stirring is continued for an hour and a half at room temperature, and the solution is concentrated in vacuo to a few milliliters. The residue is diluted with ethyl acetate, washed twice with N hydrochloric acid, twice with normal sodium carbonate and several times with water, dried over magnesium sulfate and evaporated to dryness. The oily residue is taken up with methanol and soon begins to crystallize. Cooling, filtering and washing with methanol gives about 2 g. of product M.P. about 145–147°. Recrystallization from methanol raises the M.P. to about 147–148.5°; $[\alpha]_D^{20}$ −42° (c. 1 dimethylformamide).

Analysis.—Calcd. for $C_{26}H_{32}N_6O_7$: C, 57.77; H, 5.92; N, 15.55. Found: C, 57.69; H, 5.90; N, 15.67.

EXAMPLE 2

*Benzyloxycarbonyl-nitro-L-arginyl-L-proline*

To a solution of benzyl benzyloxycarbonyl-nitro-L-arginyl-L-prolinate (770 mg.) in dioxane (10 ml.) and dimethylformamide (1.5 ml.), is added N sodium hydroxide, first 1.5 ml. and after one and a half hours another 0.5 ml. Half an hour later the solution is diluted with 60 ml. of water and extracted twice with ethyl acetate. The aqueous solution is acidified and extracted with ethyl acetate. This extract is dried over magnesium sulfate and concentrated to dryness. The residue is crystallized from methanol, about 0.550 g. of product, M.P. about 108–110° are obtained; $[\alpha]_D^{20}$ −30° (c. 2 dimethylformamide).

Analysis.—Calcd. for $C_{19}H_{26}N_6O_7$: N, 18.70. Found: N, 18.00.

The ethyl acetate extract from the still alkaline reaction mixture gives about 70 mg., M.P. 143–146°, of the unhydrolyzed ester.

EXAMPLE 3

*p-Nitrophenyl benzyloxycarbonyl-nitro-L-arginyl-L-prolinate*

A solution of benzyloxycarbonyl-nitro-L-arginyl-L-proline (1.35 g.) and p-nitrophenol (0.51 g.) in dimethylformamide (8 ml.) and acetonitrile (2.5 ml.) is stirred and cooled in an ice bath and after a few minutes dicyclohexylcarbodiimide (0.61 g.) is added. The stirring and cooling is continued for half an hour and then the stirring is continued for 18 hours at room temperature. The solvents are evaporated in vacuo, the residue taken up with ethyl acetate, the dicyclohexyl urea filtered and the ethyl acetate solution washed three times with sodium bicarbonate 1 N and three times with water, dried and evaporated to dryness. The residue is dissolved in hot ethanol, cooled to 0° for two hours, the ethanol decanted and the gummy residue treated with boiling ether, decanted and again with fresh ether until a solid (about 1 g.) (M.P. about 58–66°) is obtained. On repeating the treatment with ethanol and ether, about 0.85 g. of product, M.P. about 55–70° is obtained; $[\alpha]_D^{20}$ −64° (c. 1.07 methanol).

Analysis.—Calcd. for $C_{25}H_{29}N_7O_9$: C, 52.50; H, 5.10; N, 17.20. Found: C, 52.33; H, 5.40; N, 16.50.

EXAMPLE 4

*Methyl benzyloxycarbonyl - nitro - L - arginyl - L - prolyl-L - prolyl - glycyl - L - phenylalanyl - O - acetyl - L-seryl-L-prolyl-L-phenylalanyl-nitro-L-argininate*

The benzyloxycarbonyl group of methyl benzyloxycarbonyl - L - prolyl - glycyl - L - phenylalanyl - O - acetyl-L - seryl - L - proyl - L - phenylalanyl - nitroargininate (prepared as described in our application, Serial No. 132,298, filed August 18, 1961) is removed by treatment with hydrogen bromide in acetic acid. The remaining hydrobromide is dissolved in dimethylformamide (6 ml.) and triethylamine (0.8 ml.) and p-nitrophenylbenzyloxycarbonyl-nitro-L-arginyl-L-prolinate (0.33 g.) is added. After two and a half days at 37° the mixture is diluted with ethyl acetate (50 ml.) and 95% ethanol (2 ml.), washed with N hydrochloric acid, then with water and finally dried over magnesium sulfate. The solvents are concentrated in vacuo to about 2 ml., ethyl acetate (3 ml.) is added and the precipitated solid filtered and washed with ethyl acetate. The protected nonapeptide methyl ester (about 310 mg.) melts at about 130–140°; $[\alpha]_D^{20}$ −56° (c. 1 dimethylformamide).

Analysis.—Calcd. for $C_{61}H_{81}N_{17}O_{18} \cdot 2H_2O$: C, 53.50; H, 6.18; N, 17.31. Found: C, 53.41; H, 6.36; N, 17.27.

EXAMPLE 5

*Nitro - L - arginyl - L - prolyl - L - prolyl - glycyl - L-phenylalanyl - L - seryl - L - prolyl - L - phenyl - alanyl-nitro-L-arginine(1,9-nitroarginine bradykinin)*

To a solution of methyl benzyloxycarbonyl-nitro-L-arginyl - L - prolyl - L - prolyl - glycyl - L - phenylalanyl-O - acetyl - L - seryl - L - prolyl - L - phenylalanyl - nitro-L-argininate (10 mg.) in glacial acetic acid (1 ml.) is added hydrobromic acid in acetic acid (1 ml.). After one hour at room temperature the hydrobromide is precipitated with ether and washed several times with ether. After drying in vacuo over sodium hydroxide it is dissolved in methanol (1 ml.) and N sodium hydroxide (0.3 ml.) is added. After six hours at room temperature it is neutralized and the solvent removed in vacuo.

The invention may be variously otherwise embodied within the scope of the appended claims.

What is claimed is:
1. Nitro - L - arginyl - L - prolyl - L - prolyl - glycyl-L - phenylalanyl - L - seryl - L - prolyl - L - phenylalanyl-nitro-L-arginine.
2. p - Nitrophenyl benzyloxycarbonyl - nitro - L-arginyl-L-prolinate.
3. Methyl benzyloxycarbonyl - nitro - L - arginyl - L-prolyl - L - prolyl - glycyl - L - phenylalanyl - O - acetyl-L-seryl-L-prolyl-L-phenylalanyl-nitro-L-argininate.

References Cited by the Examiner

Greenstein: Chemistry of the Amino Acids, vol. 2, pages 887–901, 1068–75, and 1048–56 (1961).

Konzett: Nature, vol. 188, page 998 (1960).

Silva: Amer. J. Physio., vol. 156, pages 261–273 (1942).

LEWIS GOTTS, *Primary Examiner.*

LEON ZITVER, *Examiner.*